Patented July 6, 1954

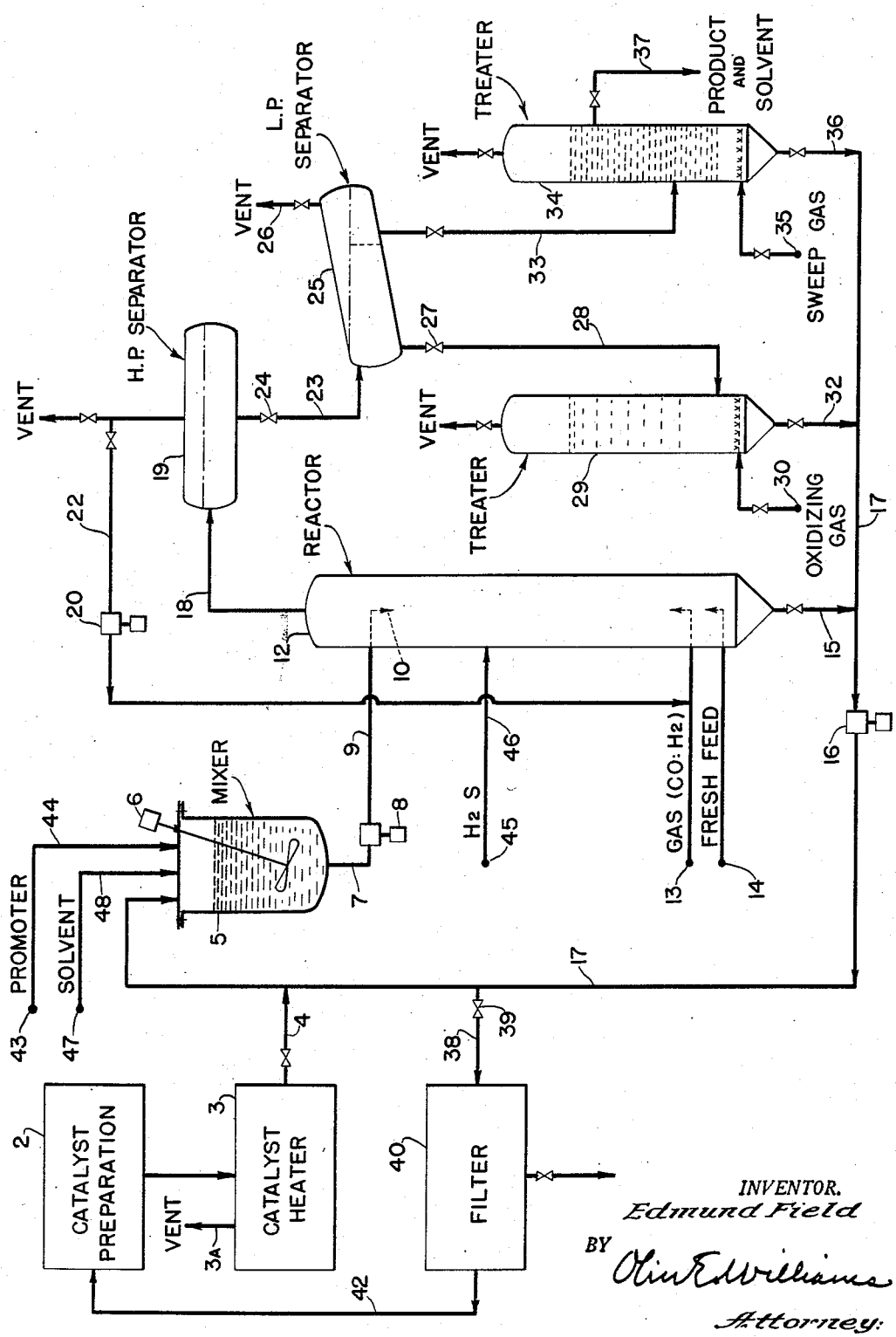

2,683,177

UNITED STATES PATENT OFFICE 2,683,177

SINGLE STAGE PROCESS FOR PREPARING ALCOHOLS FROM CO, $H_2$ AND OLEFINS

Edmund Field, Chicago, Ill., assignor to Standard Oil Company, Chicago, Ill., a corporation of Indiana Application October 29, 1949, Serial No. 124,473

5 Claims. (Cl. 260—632)

This invention relates to an improved process of direct production of alcohols by their synthesis from carbon monoxide, hydrogen and an olefin, which process is catalyzed by a cobalt compound. The invention relates more particularly to improvements in the carbinolation of olefins by the catalyzed reaction of carbon monoxide, hydrogen and olefins to produce alcohols having one more carbon atom per molecule than the reactant olefin. The term carbinolation is defined as the process of adducing a $CH_2OH$ radical on an olefin at either position of the double bond.

The direct single stage carbinolation of olefins by hydrogen and carbon monoxide in the presence of a cobalt catalyst, which in active form can be a cobalt carbonyl, hydrocarbonyl or a complex thereof, is disclosed and claimed in copending applications Ser. No. 117,662 and Ser. No. 117,664, filed September 24, 1949. The processes therein disclosed accomplished the direct carbinolation of olefins by reacting the selected olefin in liquid phase, with hydrogen and carbon monoxide, at temperatures between about 150° and 200° C., and under pressures between 50 and 300 atmospheres, carbon monoxide being maintained in the reaction zone in stoichiometric excess. The mol velocity of the reaction as expressed in mols of olefin treated per gram atom of catalyst per hour was maintained below a value of about 10 and the potential cobalt catalyst was supplied to the reaction zone in quantities above at least about 2% as cobalt by weight of reactant olefins. The mol ratio of carbon monoxide to hydrogen should be less than 2:1 and more than .2:1 and is usually approximately 1:1.

The primary object of the present invention is to provide improvements in the carbinolation process that will lend a flexibility thereto, particularly so that the limits of operating conditions can be widened and predetermined variations can be obtained in the nature of the provided product.

A further object of the present invention is the provision of a catalyst promoter in the above described catalytic carbinolation process.

The invention has for other objects such other advantages or results as will appear in the specification or claims hereinafter made.

Briefly stated, the present invention provides for promoting the carbinolation reaction by addition to the carbinolation catalyst of a promoter compound consisting of elemental sulfur or a sulfur compound that will convert under reaction conditions cobalt of the cobalt catalyst to cobalt sulfide, in an amount equivalent to 0.05% to 10% as sulfur by weight based on cobalt and preferably in an amount between 0.1% and 5% sulfur by weight based on cobalt in the catalyst. Compounds which will provide hydrogen sulfide in the reaction zone or react under the conversion conditions with cobalt of the potential cobalt catalyst to form a cobalt sulfide will promote the said reaction. Elemental sulfur and inorganic sulfur compounds such, for example, as hydrogen sulfide, ammonium sulfide and preformed cobalt sulfide are preferred promoters as many organic sulfur compounds, for example, the sulfides, disulfides, and mercaptans will not convert the cobalt to cobalt sulfide and consequently will not promote the reaction. On the other hand, the polysulfides, such as dimethyl tetrasulfides, are even more active than free sulfur and act as though elemental sulfur were dissolved in an organic sulfide.

The promoter compound can be added as a gas, for example, hydrogen sulfide, as an aqueous solution, or may be present in the olefin containing feed stock. The sulfur compound can be present as cobalt sulfide deposited on the walls of the reactor. In another embodiment of this invention, the olefinic compound or the sulful promoter is dissolved in an organic solvent that is itself substantially inert under the conditions of the carbinolation reaction but nevertheless beneficially contributes an additional increase in reaction rates or lowering of reaction temperature. The solvent is preferably an aromatic hydrocarbon, such as benzene, toluene, xylene, cumene, naphthalene, or ethyl toluene, and is chosen for ease of recovery from the specific olefin and alcohols involved.

In a further embodiment of the invention, that is particularly applicable when an insoluble potential cobalt catalyst is employed, the promoted potential catalyst is introduced as an aqueous suspension into the top of a reactor whereby the potential catalyst will be converted to active catalyst at such a rate and at such a position with respect to the reactants as will obtain optimum results. An intimate intermixing of catalyst and olefin is provided by turbulent passage of reactant gases through the liquid reaction mixture. The introduction of potential catalyst in aqueous suspension and olefin in the manner above described provides a maximum residence time of potential catalyst in the reactor and makes provision, as hereinafter described, for convenient disposal and regeneration of spent catalyst, that is especially advantageous when the catalyst is supported.

A most surprising element of the present improvement is the fact that the carbinolation reaction proceeds not only as well, but in an improved manner when the cobalt catalyst thereof is promoted by a sulfur compound. It is well known that the elemental cobalt, or contact form of hydrogenation catalyst is readily poisoned by sulfur or carbon monoxide and one distinctive element by which the carbinolation process distinguishes from the well known Oxo process, which employs the same reactants, is the fact that in the Oxo process, formylation and hydrogenation of the olefin is separately conducted and the said hydrogenation must be carried on in the absence of even small quantities of either carbon monoxide or such catalyst poisons as sulfur.

Difficulty is often encountered in initiating the carbinolation process even at elevated temperatures. It has now been found that this occurs when the reactants and the reactor surfaces are so purified that the traces of sulfur or sulfur compounds, almost universally to be found therein, have been extracted by such purification. This invention accomplishes the ready initiation of the carbinolation process and the aforesaid objects by steps including the aforementioned introduction into the reaction mixture 0.05% to 10% sulfur, by weight of cobalt, in the form of elemental sulfur or a sulfur compound, preferably hydrogen sulfide or a compound affording hydrogen sulfide that will not only markedly stimulate the initiation of the reaction but in the more practical cases of continuous operation employing reactants of technical grade the so-added sulfur will notably speed the reaction. An alternative advantage provided by the addition of promoter is a permissible lowering of reaction temperature which, as is hereinafter described, has a notable effect upon product distribution. As aforementioned, the addition of a solvent to the above named reactants when combined with a sulfur promoter provides additional benefit in initiating reaction, in further lowering the reaction temperature (or alternatively, in speeding the reaction) and in resultant alteration in product distribution.

Operation of the one-stage carbinolation process under optimum conditions of reaction as promoted by addition to the reaction mixture of a sulfur or an inorganic sulfur compound results in as high as 80% theoretical yields of substantially aldehyde-free alcohol. Over 100% yields of alcohols by weight based on introduced olefin have been prepared. For the purposes of the present process substantially aldehyde-free alcohol generally means free of aldehydes beyond that amount which, by necessity to separate or discard, would render infeasible or uneconomical the one-stage process, such amount being about 5%.

Unsaturated compounds suitable to the carbinolation process include mono-olefins, diolefins, and aryl and functionally substituted olefins unless sterically blocked; but it is preferred to employ olefinic hydrocarbons of not more than about twelve carbon atoms per molecule and having a critical temperature above the minimum carbinolation temperature so as to ensure liquid phase reaction and practicable reaction velocities. However, liquid phase reaction can be obtained if the gaseous olefins are employed in solution in hydrocarbon solvent.

The potential cobalt catalyst can be a cobalt compound that is substantially insoluble in liquids in the reaction zone or can be a compound soluble in either hydrocarbons or water, each type requiring different process steps, particularly in the recovery of product from the reaction mixture and the separation of catalyst and reactants for recycle. These cobalt potential catalysts, which are converted under reaction conditions to oil-soluble active catalysts, can be, for example, elemental cobalt, cobalt oxide, cobalt carbonate and the like, on the one hand, or cobalt acetate, cobalt chloride or cobalt naphthenate on the other. Commercially available cobalt compounds will, of course, contain small quantities of varying impurities and it is also true that such commercially obtained compounds may very well vary in physical structure. Therefore, if one wishes to obtain substantially uniform and infallible operation of the potential catalyst so that it will, for example, form active catalyst at a uniform rate and of uniform activity, it may in many instances be preferred to prepare the potential cobalt catalyst from, for example, soluble cobalt salts, shortly before use. As will be hereinafter demonstrated in greater detail fresh cobalt oxide, such as was employed in certain of the specific examples, can be prepared by several different methods hereinafter described. The so-formed active cobalt catalyst is oil-soluble and consequently homogeneous with the olefinic reactant and it is not susceptible to the known contact-catalyst poisons.

In the attached drawing, which is supplied for purposes of illustration, the single figure is a flow diagram of apparatus embodying a continuous process in which a potential catalyst aqueous slurry is circulated throughout the system and promoter compound in aqueous solution is used.

Referring now to the drawing, a method and apparatus specifically adapted for the purposes of employing insoluble catalyst aqueous slurries is illustrated. In a vessel 2 a supporter material such as pumice, is soaked with a concentrated solution or suspension of a cobalt salt, for example, cobalt carbonate, cobalt acetate or cobalt nitrate. Saturated supported material is delivered therefrom to a zone 3 wherein it is heated to a temperature of about 300° C., released gases being vented through line 3a. A product is thereby formed comprising a supported cobalt oxide which is approximately 30% by weight as cobalt. The supported cobalt oxide is thereafter delivered through a line 4 to a tank 5 having an agitator 6 wherein the oxide is slurried with water. The suspension concentration is preferably from about 5% as cobalt by weight of water to the maximum readily pumpable slurry.

Ammonium sulfide $(NH_4)_2S$, in an aqueous solution is added to the suspension in mixer 5 at a rate such that sulfur is supplied in the proportion of about one-half to one per cent by weight of employed cobalt catalyst. An inert solvent can also be added to the reaction mixture in mixer 5 as will be hereinafter described. The so-formed slurry is pumped from the mixer 5 through a pipe 7 by a pump 8 and through a pipe 9 and a nozzle 10 into the reactor 12. The so-formed catalyst slurry settles in the reactor 12 in countercurrent relationship to rising reactant gas. The said reactant gas is delivered from a source 13 into the reactor 12 at a point near the bottom thereof. Fresh olefin feed can also be delivered to the reactor at approximately this point from a source 14.

Settled catalyst slurry plus a very minor quantity of olefin can be recycled by withdrawing the same through valved pipe 15 by operation of a pump 16 disposed in line 17 and returning the same therethrough to mixer 5. Product oils and unreacted gases are flowed from reactor 12 through a line 18 to a high pressure separator 19. Reactant gases are separated therein and are at least in part recycled by means of a compressor 20 through a line 22 and into the reactor 12. Cooling means, not shown, can be disposed in line 16 to control reaction temperatures.

Product and catalyst suspension are withdrawn through a line 23 containing therein a pressure reducing valve 24 and are flowed into a low pressure separator 25. Dissolved gases are separated from the product in the separator 25 in which the product is maintained at a temperature between 150 and 170° C. and under approximately 200 pounds per square inch gage pressure. The said gases, containing predominantly carbon monoxide, are released through vent line 26. The described release in pressure and maintenance of substantially the reaction temperature in separator 25 provide a phase migration of oil-soluble active catalyst from the product oils into solution at least in part, or as a settling solid, in the aqueous phase which settles to the bottom of the separator 25.

Supported potential catalyst slurry that has settled in the separator 25 from clear product oils is drained by operation of valve 27 in pipe 28 from the said separator 25. The so-separated aqueous slurry containing cobalt catalyst is heated and treated with a mildly oxidizing gas that is flowed into vessel 29 from a source 30 to convert the catalyst at least in part to cobalt oxide. The so-formed slurry of cobalt oxide is returned through valved line 32 and header 17 to the mixing tank 5 and hence is recycled to the reactor 12. A supernatant product oil phase containing both product and solvent is decanted through a valved pipe 33 to a treater 34 wherein the product oil is treated with a hot sweep gas, such as carbon dioxide or steam, that is delivered from a source 35 to precipitate minor remaining quantities of cobalt catalyst compounds which can be withdrawn through valved line 36 into header 17 and be recycled to mixer 5. Crude alcoholic product dissolved in the employed solvent is flowed from the treater 34 through a valved line 37. Fractionating equipment not shown is employed to separate produced alcohols from the solution of product oils that is withdrawn through the said line 37.

Catalyst slurry can be revivified by withdrawing a portion thereof through line 38 by operation of valve 39 and filtering and drying the slurry in filter 40. So recovered solid cobalt compound or pumice supporter can then be returned by conventional conveyor means 42 to catalyst preparation zone 2. In this manner cobalt-denuded catalyst supporting material or spent catalyst can be withdrawn from the system at the point of their highest concentration, and can be employed in the preparation of fresh catalyst in zone 2.

A sulfur promoter compound is added to the catalyst in mixer 5 from a source 43 from which it is delivered through the line 44 to the said mixer. The said promoter can be elemental sulfur or an inorganic sulfur compound, such as ammonium sulfide, or it can be, for example, hydrogen sulfide which may be introduced either as an aqueous solution of hydrogen sulfide or by passing the gas into the aqueous suspension in mixer 5. Hydrogen sulfide also can be flowed from a source 45 through line 46 into the reactor column 12 at a point approximately one-third the length of the reactor below the point of introduction of catalyst. With introduction in this manner the very small quantity of hydrogen sulfide required to provide adequate promoter sulfur will quickly react with cobalt catalyst in the reactor and prevent emission of hydrogen sulfide through the line 18. In addition, the descending cobalt catalyst will be promoted by the so-added sulfur before coming in contact with the major portion of the reactant gas and fresh feed.

The aforementioned hydrocarbon solvent, which provides additional benefits in promoting the carbinolation reaction, is flowed from a source 47 through a pipe 48 into the said mixer 5 so that it will be thoroughly admixed with the aqueous catalyst solution or suspension before the latter is introduced into the reactor 12. Solvent also can be introduced with fresh feed in which olefinic material can be in solution in the employed solvent. A preferred solvent and one that is particularly adaptable to providing a simple product separator system is toluene.

In certain applications other alternatives may be found more economical to operate, for example, the following method can suitably be employed for the introduction of suspended cobalt oxide or other water insoluble cobalt compounds into a continuously operated reactor. Two batch autoclaves can be employed to feed alternately into the bottom of the reactor which is a tower filled with olefinic charge with carbon monoxide and hydrogen injected at various points to ensure maximum gas contact. One autoclave is charged with the hereinbefore described inert solvent, for example, benezene, toluene, or naphthalene. Powdered cobalt oxide which can be prepared by thermal decomposition of cobalt nitrate or carbonate and which can be mixed with elemental cobalt is suspended in the liquid in the autoclave. Sulfur promoter is added to the mixture in the autoclave. The mixture in the autoclave is agitated and heated to 120° to 165° C. for one to eight hours under the same operating pressure and in the presence of carbon monoxide and hydrogen in the same ratio as that used in the reaction. The suspension in the autoclave can be fed into the reactor either by gas displacement or use of a liquid injection pump. The employment of two autoclaves of course permits a continuous feed of catalyst suspension to the reactor.

The cobalt oxide that is used in the specific examples can be prepared by heating cobalt nitrate that is either anhydrous or contains water of crystallization slowly to a maximum temperature of 280° to 300° C. The heating cycle can start at 150° C. and reach the maximum temperature in 8 to 24 hours, followed by 2 to 8 hours at the top temperature. The rate of heat can be adjusted to maintain a reasonably constant rate of decomposition. The decomposition is best carried out in shallow corrosion-proof vessels in an atmosphere of air or nitrogen. The resultant cake should be crushed to pass a 20 mesh screen or finer.

Cobalt oxide can also be prepared from an aqueous solution of a cobalt salt, for example, cobalt chloride, cobalt sulfate, cobalt formate or cobalt acetate. The solution is alkalized to just the point of alkalinity and is heated. Precipitated cobalt compound is thereafter filtered from the solution and is heated to a temperature between 280° to 300° C. and the resultant cake is subsequently pulverized to prepare the finely divided cobalt oxide.

The following specific examples are provided to illustrate more clearly the process of the present invention and the benefits derivable therefrom.

Example I

A 100 cc. autoclave was charged with 18 grams of octene-1 to which was added cobalt in the form of both cobalt oxide (2.5 grams) and cobalt acetate (1 gram) totaling 2.0 grams of cobalt. 14 grams of water were also added to the reactor. An aqueous solution of ammonium sulfide containing 0.05 gram of sulfur was then introduced, and an equimolar mixture of carbon monoxide and hydrogen was pumped into the reactor under a pressure of 1400 pounds per square inch gage. The temperature was raised to 150° C. (pressure reached 1790 pounds per square inch gage) at which point reaction started. Pressure dropped to 510 pounds per square inch gage in 3 hours. The reactor pressure was then raised to 1740 pounds per square inch gage with hydrogen and held for 3 hours at 156° C. Then the reactor was cooled, purged of gases and another portion of equimolar hydrogen and carbon monoxide was pumped into the reactor and heated at 150°–156° C. for 4 more hours. The distribution of the obtained product was as follows: 77% nonyl alcohol, 3.5% nonyl aldehyde and 19.5% bottoms.

Example II

There was placed in the same autoclave that was employed in Example I 14 grams of octene-1, 15 grams H₂O, 2.0 grams of cobalt oxide and 0.1 cc. of ammonium sulfide equalling 0.01 gram sulfur. Hydrogen and carbon monoxide in a mol ratio of 1:1 were introduced into the autoclave under a pressure of 1500 pounds per square inch. An average reaction temperature of 160° C. and pressures above 1600 pounds per square inch were maintained for a period of 9 hours, although most of the reaction was completed in the first hour. The distribution of product was as follows: 67% nonyl alcohol, 3% nonyl aldehydes and 30% bottoms.

Example III

There was introduced into the same autoclave that was used in Examples I and II, 14 grams of octene-1, 15 grams of water, 2.0 grams of specially prepared cobalt oxide and 0.1 cc. of an ammonium sulfide solution equivalent to 0.1 gram of sulfur. This especially active form of cobalt oxide was prepared by precipitating a basic carbonate from cobalt nitrate with sodium carbonate, washing and decomposing in air at 300° C. Reactant gas in the proportion of 46.7% hydrogen and 47.0% carbon monoxide was introduced into the reactor under a pressure of 1500 pounds per square inch. The temperature was raised to an average of 160° C. during the entire reaction period of 7 hours. Maximum reaction pressure was 1910 pounds per square inch, minimum was 1035 pounds per square inch and final pressure was 1550 pounds per square inch. Reaction was essentially complete in 4 hours. A mol velocity of 1.1 mols of olefin per gram atom of cobalt per hour was maintained. The distribution of product was as follows: 82% nonyl alcohol, 5% nonyl aldehydes and 13% botttoms.

Example IV

There was placed in a one liter autoclave 202 grams of sulfur-free heptene-1. To this olefin was added 2 weight percent of cobalt as finely divided cobaltic oxide. Hydrogen and carbon monoxide in a mol ratio respectively of 1:1 were introduced into the autoclave and were maintained therein under a pressure of 3000 pounds per square inch and at a temperature in the range of 165° to 171° C. Even though an extended total treating period of 14 hours was employed, nevertheless no reaction was observed.

The following run was made under substantially the same conditions except that sulfur was present in the reaction zone. A mixture consisting of 185 grams of mixed octenes, 0.1 gram of sulfur, and 2 weight per cent of cobalt as finely divided cobaltic oxide was reacted with hydrogen and carbon monoxide in a mol ratio respectively of 1:1. The reaction temperature was maintained at about 160° C. and the pressure at 3000 pounds per square inch. A reaction period of 4 hours at a mol velocity of 5.8 mols of mixed octenes per atom of cobalt per hour provided a product having the following composition:

58.6% nonyl alcohol
34.0% high boiling bottoms
5.2% low boiling product
2.2% aldehyde-containing intermediate.

A process also employing a sulfur-type catalyst promoter but in which the reaction temperatures are kept below 140° C. so that carbinolation of the olefins will not be accomplished is disclosed and claimed in a copending application of the applicant and another Serial No. 124,474 filed October 29, 1949.

Having described my invention, I claim the following:

1. The method of converting olefins containing not more than 12 carbon atoms per molecule in a charging stock initially substantially free from elemental sulfur and inorganic sulfur compounds directly in a one stage process chiefly to alcohols containing one more carbon atom than the corresponding olefins together with a smaller amount of higher boiling products but not substantially more than about 5 per cent by weight of aldehydes which method comprises introducing said olefins into a conversion zone, also introducing into said zone carbon monoxide and hydrogen in a mol ratio less than 2:1 but more than .2:1, an effective amount of a cobalt compound convertible under reaction conditions into active cobalt carbinolation catalyst and a sulfur-containing promoter selected from the class which consists of elemental sulfur and inorganic sulfur compounds which under reaction conditions provide cobalt sulfide, the amount of promoter being in the range of .05 per cent to 10 per cent by weight of promoter sulfur based on the cobalt component of the catalyst, and contacting said olefins, hydrogen, carbon monoxide, catalyst and promoter at a temperature in the range of 150° to 200° C. under a pressure in the range of 50 to 300 atmospheres at a mol velocity less than 10 mols of olefin per gram atom of cobalt per hour, whereby said alcohols are produced directly as the principal product.

2. The method of claim 1 which includes the step of effecting said contacting in the presence of an aromatic hydrocarbon solvent.

3. The method of claim 1 wherein the promoter is hydrogen sulfide.

4. The method of claim 1 wherein the promoter is ammonium sulfide.

5. The method of claim 1 wherein the promoter is elemental sulfur.

References Cited in the file of this patent

UNITED STATES PATENTS

| Number | Name | Date |
|---|---|---|
| 2,327,066 | Roelen | Aug. 17, 1943 |
| 2,403,524 | Hagemann | July 9, 1946 |
| 2,500,210 | Schexnailder | Mar. 14, 1950 |
| 2,517,383 | Brooks | Aug. 1, 1950 |
| 2,530,989 | Parker | Nov. 21, 1950 |
| 2,564,130 | Schreyer | Aug. 14, 1951 |
| 2,581,988 | Spijker et al. | Jan. 8, 1952 |

FOREIGN PATENTS

| Number | Country | Date |
|---|---|---|
| 879,903 | France | Dec. 10, 1943 |

OTHER REFERENCES

FIAT Final Report No. 1000-PB 81,383, Dec. 26, 1947, Microfilm Reel, page 28.

German Patent Application I 70 739 Ivd./120 (O. Z. 13,059) T. O. M. Reel 36, Item 21. Deposited in Library of Congress, April 18, 1946. (Complete reference of Abstract 286, of record). Available as Meyer Translation PC–S–V (pages 28–30).

Synthetic Liquid Fuels Abstracts (New Series) Bureau of Mines, vol. 1, No. 2, 1948, page 24.

Wender et al., Critical Review of Chemistry of OXO Synthesis for Production of Alcohols from Olefins, CO and Hydrogen, Bureau of Mines, R. I. 4270, June 1948, pages 6 and 7.

Wender et al. (II), Journal American Chemical Society, vol. 72, No. 10, pages 4375–4378, October 1950. Presented before 116th meeting, A. C. S. September 1949.